United States Patent
Yu et al.

(10) Patent No.: US 12,380,360 B2
(45) Date of Patent: Aug. 5, 2025

(54) INTERPRETABLE IMITATION LEARNING VIA PROTOTYPICAL OPTION DISCOVERY FOR DECISION MAKING

(71) Applicant: NEC Laboratories America, Inc., Princeton, NJ (US)

(72) Inventors: Wenchao Yu, Plainsboro, NJ (US); Haifeng Chen, West Windsor, NJ (US); Wei Cheng, Princeton Junction, NJ (US)

(73) Assignee: NEC Corporation, Tokyo (JP)

( * ) Notice: Subject to any disclaimer, the term of this patent is extended or adjusted under 35 U.S.C. 154(b) by 1077 days.

(21) Appl. No.: 17/323,475

(22) Filed: May 18, 2021

(65) Prior Publication Data

US 2021/0374612 A1 Dec. 2, 2021

Related U.S. Application Data

(60) Provisional application No. 63/029,754, filed on May 26, 2020, provisional application No. 63/033,304, filed on Jun. 2, 2020.

(51) Int. Cl.
*G06N 20/00* (2019.01)
*G06F 16/951* (2019.01)
(Continued)

(52) U.S. Cl.
CPC ........... *G06N 20/00* (2019.01); *G06F 16/951* (2019.01); *G06N 20/10* (2019.01); *G06N 20/20* (2019.01)

(58) Field of Classification Search
CPC ........ G06N 20/00; G06N 20/10; G06N 20/20; G06N 3/082; G06N 3/045; G06N 7/01;
(Continued)

(56) References Cited

U.S. PATENT DOCUMENTS

| 2019/0324795 A1* | 10/2019 | Gao | G06F 9/4843 |
| 2020/0334093 A1* | 10/2020 | Dubey | G06F 18/23 |
| 2021/0295171 A1* | 9/2021 | Kamenev | G06N 3/088 |

FOREIGN PATENT DOCUMENTS

| CA | 2872831 A1 * | 11/2012 | H04L 12/462 |
| CN | 105393264 A * | 3/2016 | G06F 16/951 |

(Continued)

OTHER PUBLICATIONS

Abbeel et al., "Apprenticeship Learning via Inverse Reinforcement Learning", Proceedings of the 21st International Conference on Machine Learning. Jul. 5-9, 2004. pp. 1-8.

(Continued)

*Primary Examiner* — Steven P Sax
(74) *Attorney, Agent, or Firm* — Joseph Kolodka

(57) ABSTRACT

A method for learning prototypical options for interpretable imitation learning is presented. The method includes initializing options by bottleneck state discovery, each of the options presented by an instance of trajectories generated by experts, applying segmentation embedding learning to extract features to represent current states in segmentations by dividing the trajectories into a set of segmentations, learning prototypical options for each segment of the set of segmentations to mimic expert policies by minimizing loss of a policy and projecting prototypes to the current states, training option policy with imitation learning techniques to learn a conditional policy, generating interpretable policies by comparing the current states in the segmentations to one or more prototypical option embeddings, and taking an action based on the interpretable policies generated.

18 Claims, 8 Drawing Sheets

(51) Int. Cl.
*G06N 20/10* (2019.01)
*G06N 20/20* (2019.01)

(58) Field of Classification Search
CPC .. G06N 7/02; G06V 30/19173; G06V 10/454;
G06V 10/44; G06F 18/24; G06F 9/50;
G06K 9/66; H04L 47/83; H04L 63/10
See application file for complete search history.

(56) References Cited

FOREIGN PATENT DOCUMENTS

| | | | | | |
|---|---|---|---|---|---|
| CN | 105893256 | A | * | 8/2016 | ......... G06F 11/3676 |
| CN | 108805877 | B | * | 11/2019 | ............. G06N 20/00 |
| CN | 110491171 | A | * | 11/2019 | |
| CN | 111712862 | A | * | 9/2020 | ........... G08G 1/0112 |
| CN | 111950950 | A | * | 11/2020 | |
| CN | 109739585 | B | * | 2/2022 | |
| EP | 3462385 | A1 | * | 4/2019 | ......... G06F 16/9024 |
| EP | 2504776 | B1 | * | 6/2019 | ........... G06F 16/285 |
| JP | 2017142549 | A | * | 8/2017 | |
| JP | 7390126 | B2 | * | 12/2023 | |
| KR | 20130049201 | A | * | 5/2013 | |
| WO | WO-2020162680 | A1 | * | 8/2020 | ............. H04L 63/06 |
| WO | WO-2020235693 | A1 | * | 11/2020 | |

OTHER PUBLICATIONS

Eysenbach et al., "Diversity is All You Need: Learning Skills Without a Reward Function", arXiv:1802.06070v6 [cs.AI]. Oct. 9, 2018. pp. 1-22.
Ho et al., "Generative Adversarial Imitation Learning", arXiv:1606.03476v1 [cs.LG]. Jun. 10, 2016. pp. 1-14.
Li et al., "InfoGAIL: Interpretable Imitation Learning from Visual Demonstrations", arXiv:1703.08840v2 [cs.LG]. Nov. 14, 2017. pp. 1-14.
Ming et al., "Interpretable and Steerable Sequence Learning via Prototypes", 25th ACM SIGKDD Conference on Knowledge Discovery and Data Mining, Aug. 4-8, 2019. pp. 1-11.
Tomar et al., "Successor Options: An Option Discovery Framework for Reinforcement Learning", associarXiv:1905.05731v1 [cs.LG]. May 14, 2019. pp. 1-7.

* cited by examiner

Option Prototype Learning

$$\mathcal{L}_{emb} = \sum_{m=1}^{M} \min_{k=1}^{K} \|f_\phi(s_{v_{m'}:v_m}) - \mathbf{o}_k\|_2^2)$$

Option Prototype Embedding Learning

$$\mathcal{L}_{option} = -\lambda_1 * \mathcal{L}_{IM_{loss}} + \lambda_2 * \sum_{i=1}^{K} \min_{m=1}^{M} \|f_\phi(s_{v_{m'}:v_m}) - \mathbf{o}_i\|_2^2) +$$

$$\lambda_3 * \sum_{i=1}^{K} \sum_{j=i+1}^{K} max(0, d_{min} - \|\mathbf{o}_i - \mathbf{o}_j\|)$$

Option Policy Learning

$$\mathcal{L}_{IM_{BC}} = \sum_{o_k \in O} [\sum_{<s,a> \sim \tau} [\sum_{k=1}^{K} \pi_E(o_k|s) \log \pi_{\theta,O}(o_k|s,o_k)]] +$$

$$\mathcal{L}_{IM_{AIL}} = \sum_{o_k \in O} [\sum_{<s,a> \sim \tau} [D_{KL}\left(\rho_{\pi(a|s,o_k)} \| \frac{\rho_{\pi(a|s,o_k)} + \rho_{\pi_E}}{2}\right)$$

$$+ D_{KL}\left(\rho_{\pi_E} \| \frac{\rho_{\pi(a|s,o_k)} + \rho_{\pi_E}}{2}\right)]$$

FIG. 8

INTERPRETABLE IMITATION LEARNING VIA PROTOTYPICAL OPTION DISCOVERY FOR DECISION MAKING

RELATED APPLICATION INFORMATION

This application claims priority to Provisional Application Nos. 63/029,754, filed on May 26, 2020, and 63/033,304, filed on Jun. 2, 2020, the contents of both of which are incorporated herein by reference in their entirety.

BACKGROUND

Technical Field

The present invention relates to imitation learning and, more particularly, to methods and systems related to interpretable imitation learning via prototypical option discovery.

Description of the Related Art

Humans have the ability to compose options or skills to solve a complex problem. For example, to treat a COVID-19 patient with a critical condition, an intensive care unit (ICU) doctor needs to compose essential skills such as endotracheal intubation, chest-tube placement, and arterial and central venous catheterization. Discovering the compositional structures from experts' trajectories is beneficial to understand the experts' policy as well as learn a new policy.

SUMMARY

A method for learning prototypical options for interpretable imitation learning is presented. The method includes initializing options by bottleneck state discovery, each of the options presented by an instance of trajectories generated by experts, applying segmentation embedding learning to extract features to represent current states in segmentations by dividing the trajectories into a set of segmentations, learning prototypical options for each segment of the set of segmentations to mimic expert policies by minimizing loss of a policy and projecting prototypes to the current states, training option policy with imitation learning techniques to learn a conditional policy, generating interpretable policies by comparing the current states in the segmentations to one or more prototypical option embeddings, and taking an action based on the interpretable policies generated.

A non-transitory computer-readable storage medium comprising a computer-readable program for learning prototypical options for interpretable imitation learning is presented. The computer-readable program when executed on a computer causes the computer to perform the steps of initializing options by bottleneck state discovery, each of the options presented by an instance of trajectories generated by experts, applying segmentation embedding learning to extract features to represent current states in segmentations by dividing the trajectories into a set of segmentations, learning prototypical options for each segment of the set of segmentations to mimic expert policies by minimizing loss of a policy and projecting prototypes to the current states, training option policy with imitation learning techniques to learn a conditional policy, generating interpretable policies by comparing the current states in the segmentations to one or more prototypical option embeddings, and taking an action based on the interpretable policies generated.

A method for learning prototypical options for interpretable imitation learning is presented. The method includes dividing a task, by a processor, into a plurality of sub-tasks via a learning policy over options, learning, by the processor, different options to solve each of the plurality of sub-tasks by mimicking expert policy, and fine-tuning the learning policy to learn to take an action based on the task.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 8 illustrates exemplary equations for implementing the IPOD architecture, in accordance with embodiments of the present invention.

DETAILED DESCRIPTION OF PREFERRED EMBODIMENTS

Figure 1:
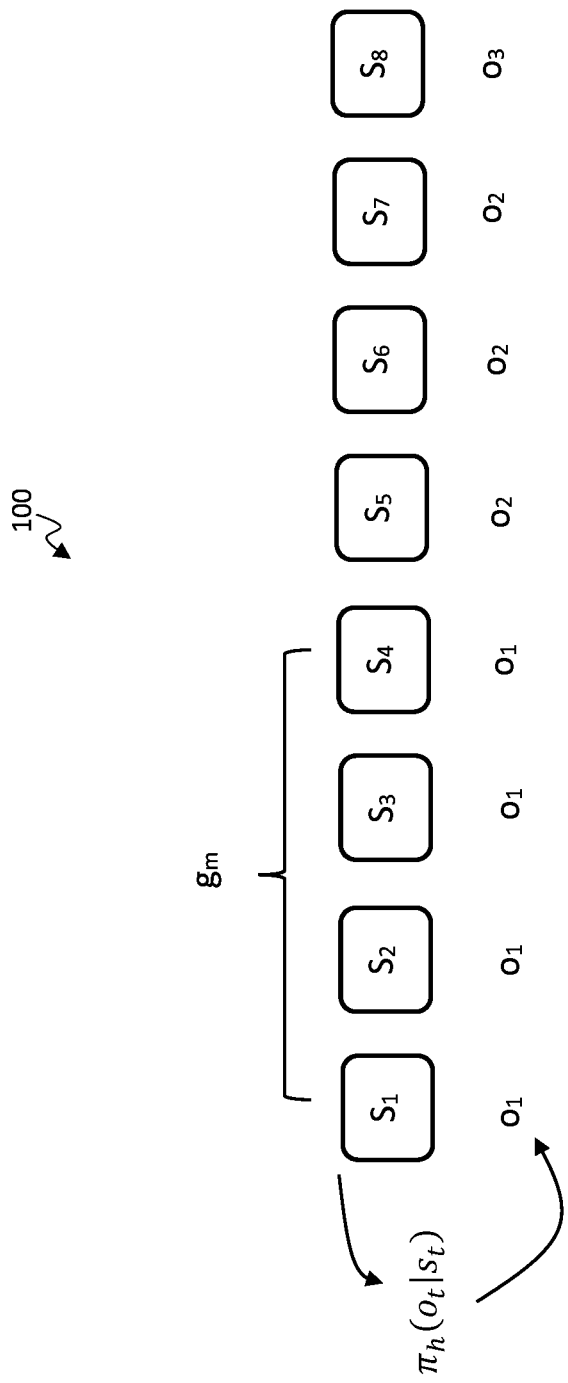
FIG. 1 is a block/flow diagram of an exemplary option selection mechanism, in accordance with embodiments of the present invention.

Imitation learning which mimics experts' behaviors is beneficial to finding meaningful structure or skills in the experts' demonstrations. Despite the superior performance of imitation learning models, they are usually considered as "black-boxes" which lack transparency, limiting their application in many decision-making scenarios, e.g., healthcare and finance. A variety of methods learn a hidden variable of the variation underlying expert demonstrations to construct the structure of expert policy and visualize the changes in the hidden variable. However, post-hoc explanations do not explain the reasoning process of how the model makes its decisions and can be incomplete or inaccurate in capturing the reasoning process of the original model. Therefore, it is often desirable to have models with built-in interpretability.

The exemplary embodiments address such issues by defining a form of interpretability in imitation learning that imitates human abstraction and explains its reasoning in a human-understanding manner. The exemplary methods employ prototype learning to discovery options for built-in interpretable imitation learning. Prototype learning, which drives from the study of human reasoning, is a form of case-based reasoning, which makes decisions by comparing new inputs with a few data instances (prototypes) in, e.g., image recognition, sequence classification, sequence segmentation, etc.

The exemplary methods discover prototypical options for interpretable imitation learning. The exemplary methods introduce a network architecture referred to as prototypical option discovery (IPOD). Each prototypical option is responsible for explaining a group of variable-length segments of the demonstration trajectories. To learn the prototypical options, IPOD first learns a policy to break the trajectories into a set of segmentations, which results in K groups of segments for the K prototypical options. IPOD uses LSTM with a soft-attention mechanism to derive segment embedding. For each group of segments, the exemplary methods learn a prototypical contextual policy to take action with states as well as the option embedding, which is determined based on centroids of the segment embedding, as inputs. In this way, the model is interpretable, in the sense that it has a transparent reasoning process when making decisions. For better interpretability, the exemplary methods define several criteria for constructing the prototypes, including option diversity and prediction accuracy.

The exemplary embodiments introduce an imitation learning framework that learns interpretable policy via prototypical options which include segmentation prototypes. The exemplary embodiments enable learning the prototypical option embedding by weighted segmentation for sparsity and learn the prototypical option's policy by driving the option-relevant information via option embedding. The goal is to learn a new policy it, which imitates the expert behavior by maximizing the likelihood of given demonstration trajectories. Thus, the behavior of an expert agent can be copied to accomplish a desired task.

Imitation learning refers to learning a policy that mimics the behavior of experts who demonstrate how to perform the given task. The behavior of the expert demonstrator is represented by trajectories $\tau=[s_0, a_0 \ldots, s_T, a_T]$, which is a sequence of state action pairs. Imitation learning has various approaches. One approach is behavior cloning (BC), which directly maps from the state to the action. This method usually learns a policy through standard supervised learning. BC does not perform any additional policy interactions with the learning environment, but it suffers from distributional drift. Another approach is inverse reinforcement learning (IRL), which learns a policy by recovering the reward function from demonstrations and with dense reward signals provided from the learned reward function. However, the learned policy is valid only while the learned reward function is valid. Yet another approach is adversarial imitation learning (AIL), which constrains the behavior of the agent to be approximately optimal with an unknown reward function without explicitly attempting to recover that reward function. However, both AIL and IRL require interacting with the environment for generating the agent's trajectory for comparison with the expert's trajectory. Recently, imitation learning with neural networks efficiently learns a desired behavior in complex environments. However, these methods are usually considered as "black-boxes," which lack transparency. The exemplary methods introduce an interpretable imitation learning framework for more applications of imitation learning, e.g., healthcare, finance, etc.

An option is a generalization of an action (also known as a skill, sub-policy or a sub-goal). Formally, an option is a three-tuple that includes the start, end probability of an option and the policy of the option. Options offer great potential for mitigating the difficulty of solving complex Markov decision processes (MDPs) via temporally extended actions.

Interpretable modeling mainly falls into two categories, that is, intrinsic explanation which makes the model transparent by restricting the complexity, e.g., decision tree or case-based (prototype-based) model, and post-hoc explanation, which is achieved by analyzing the model after training, e.g., extracting the importance of states via attention and distilling a black-box policy into a simple structure policy. A set of post-hoc imitation learning was proposed for generating meaningful policy. However, the intrinsic explanation model is sometimes desirable since post-hoc explanations usually do not fit the original model precisely. Prototype learning, which draws conclusions for new inputs by comparing them with a few exemplary cases (e.g., prototypes) belongs to the intrinsic explanation method.

The options framework models skills as options, which is a closed-loop policy to solve the sub-tasks. For example, picking up an object, jumping, etc. are options, which require a user to take actions over a period of time. An option o includes the following components, that is, its initiation condition, $I_o$ (s), which determines whether o can be executed in state s, its termination condition, $\beta_o$ (s), which determines whether option execution must terminate in state s and its closed-loop control policy, $\pi_o$ (s), which maps state s to a low-level action a.

Prototype theory emerged in 1971 with the work of psychologist Eleanor Rosch, and it has been described as a "Copernican revolution" in the theory of categorization. In prototype theory, any given concept in any given language has a real-world example that best represents this concept. For instance, when asked to give an example of the concept of fruits, an apple is more frequently cited than, a durian. This theory claims that the presumed natural prototypes were central tendencies of the categories. Prototype theory has also been applied in machine learning, where a prototype is defined as a data instance that is representative of all the data. There are many approaches to find prototypes in the data. Any clustering algorithm that returns actual data points as cluster centers would qualify for selecting prototypes.

The exemplary embodiments introduce the formulation of the prototypical option, which is a kind of option that can be presented by an instance of the trajectories generated by the experts. A prototypical option o includes four components $<I_o, \pi_o, \beta_o, g_o>$, that is, an intra-option policy $\pi_o: S \times \mathcal{A} \to [0, 1]$, a termination condition $\beta_o: S \to [0, 1]$, an initiation state set $I_o \in S$ and an option prototype $g_o$.

Specifically, $g_o$ is defined by sub-trajectories generated by the experts. Given the trajectories of the expert $\tau=\{s_1, a_1, \ldots, s_T, a_T\}$, the prototypical option is a set of segments $(g_1, g_2, \ldots g_K)$, where $$g_k = s_{v_{m'} : v_{m,m'}} = m - 1.$$

Here, $v_m \in [1,T]$ are segment boundary indicator variables with $v_0=0$, $v_m=T$, $v_m \geq v_m'$, e.g., $g_o=s_{2:4}$, so that $g_o=[s_2,s_3,s_4]$.

A prototypical option $<I_o, \pi_o, \beta_o, g_o>$ is available in state $s_t$ if and only if $s_t \in I_o$. If the option is taken, then actions are selected according to $\pi_o$ until the option terminates according to $\beta_o$. In a prototypical option, $g_o$ is considered as a real-world example to explain the option.

Options discovery is based on the intuition that it would be easier to solve the long-horizon task from temporal abstraction, e.g., separate or divide the long-horizon task into a set of sub-tasks, and select different options to solve for each sub-task. This intuition informs the steps of the algorithm, that is, breaking or dividing the trajectories into a set of subtasks via learning a policy $\pi_h$ over options, learning (or discovering) options that could solve these sub-tasks by mimicking the expert' policy, and, once such options are learned, the exemplary embodiments fine-tune $\pi_h$ to learn to take an option based on the current task.

Formally, given the trajectories of the expert $\tau = \{s_1, a_1, \ldots, s_T, a_T\}$, the goal is to first break or divide trajectories $\tau$ into M disjoint segments $(g_1, g_2, \ldots, g_M)$, where $$g_k = s_{v_{m'}:v_m,m'}, s_{v_{m'}:v_m,m'} = (s_{v_{m'}+1}, \ldots, s_{v_{m'}}),$$

m'=m−1. Here, $v_m \in [1, T]$ are segment boundary indicator variables with $v_0=0$, $v_M=T$, $v_m \geq v_m'$. The segments are grouped into K clusters and learn each cluster's prototypical options, where $G_k = \{g_m\}_{m \in \{0, 1, \ldots, M\}}$ indicate the m-th group segments.

The exemplary embodiments leverage prototype learning to introduce an interpretable imitation learning framework by prototypical option discovery, where each prototypical option is responsible for explaining a group of variable-length segments of the demonstration trajectory. As presented in FIG. 2, I2L 200 addresses interpretable imitation learning tasks with steps to learn prototypical options $<I_o$, $\pi_o, \beta_o, g_o>$. To learn the initial state set $I_o$ and the termination condition $\beta_o$, the exemplary methods learn a policy $\pi_h$ (o|s) over options to break or divide the trajectories into a set of segmentations, which results in K groups of segments for the K prototypical options. To learn the option prototype $g_o$, the exemplary methods map each segment into an option embedding $$\delta_{v_{m'}:v_m}$$

and cluster to them to find K central nodes as option prototypes $g_o$, o={1, . . . , K}. As for learning intra-option policy $\pi_o$, the exemplary methods learn a prototypical contextual policy $\lambda$(a|s, o) to take action based on states, as well as the option embedding.

In options learning ($I_o$ and $\beta_o$) step, $\pi_h$(o|s) first constructs a set of admissible options given by: $O(s_t) = \{o_i | I_{o_i}(s_t) = 1 \cap \beta_{o_i}(s_t) = 0, \forall o_i \in O\}$. Here the $O(s_t)$ is updated according to the $\pi_h$ (o|s). IPOD 200, in FIG. 2, determines the $Io_i(s_t)$ and $\beta_{oi}(s_t)$ by the output of $\pi_h$, e.g., $o_t$, where if $o_t=1$, $Io_i(s_t)=1$ and $\beta o_i(s_t)=0$, otherwise $Io_i(s_t)=0$ and $\beta o_i(s_t)=1$. An example of how the agent $\pi_h$(o|s) selects an option is shown in structure 100 of FIG. 1.

With regards to learning the policy over options, $\pi_h$ (o|s) is learned by choosing the admissible prototypical option. Since the exemplary methods utilize imitation learning to learn the intra-option policy, the reward of $\pi_h$ (o|s) is obtained by the selected option $\pi_o$ which takes primitive actions and receives the reward signal. Thus, the reward of the option is the cumulative reward of the actions taken from a current time to the termination of the option:

$$r_{t:t+\delta} = r_t + \ldots + r_{\{t+\delta\}},$$

where $\delta \in [0,T]$ is the time interval of the option t+$\delta$ is the termination of the option $o_t$.

Given the transition $(s_t, o_t, r_{t:t+s})$ we update $\pi_h$(o|s) taking option $o_t$ at state $s_t$ according to policy gradient:

$$\nabla J = \mathbb{E}_{s \sim \pi_h}[Q(s, \pi_h(o_t|s_t)]$$

where the option-value $Q(s_t, o_t)$ refers to the expected rewards for an action $o_t$ taken in a given state $s_t$. Updating options to the policy over options, the above equations show how the exemplary methods can learn the policy $\pi_h$ over option and use it for selecting options. However, before learning $\pi_h$, the exemplary methods must assign appropriate initial parameters to $\pi_h$. The exemplary methods segment the trajectories by detecting the bottleneck states within the trajectories. Bottlenecks have been defined as those states which appear frequently on successful trajectories to a goal but not on unsuccessful ones or as nodes which allow for densely connected regions of the interaction graph to reach other such regions. Informally, bottleneck areas have been described as the border states of densely connected areas in the state space or as states that allow transitions to a different part of the environment. A more formal definition defines bottleneck areas as those states which are local maxima of betweenness, a measure of centrality on graphs, on a transition graph.

The exemplary methods extract all the states in the trajectories, and use density-based spatial clustering methods (e.g., DBSCAN) to automatically cluster the states into K groups. In the exemplary methods, each state group indicates one option's valid states (where $I_o(s)=1$. That is, the initial $\pi_h$ will take that option while it is in these states via behavior cloning.

In option prototype learning, the exemplary methods aim to learn the option prototype, which is a sub-trajectory or segment generated by the experts. Each option prototype is responsible for explaining a group of variable-length segments of the demonstration trajectory $g_m$ generated by $\pi_h$. Thus, the exemplary methods first initialize K option prototype embedding $o_k \in \mathbb{R}^n$, k={1, 2, 3, . . . , K} vectors as learnable parameters. Next, the exemplary methods map each group of segments $g_{m,k}$ individually into a low dimension embedding $g_{m,k}$ by classifying the segment into the corresponding option's category k. Meanwhile, the exemplary methods learn $o_k$ by minimizing the distance between $o_k$ and $g_{m,k}$. Finally, the exemplary methods consider the segment which has the smallest distance with $o_k$ as the option prototype of $o_k$.

Regarding segmentation embedding learning, the exemplary methods aim to learn a meaningful latent space to represent the segments, where they are clustered (in L2-distance) around semantically similar prototypical options, and the clusters from different classes are well-separated.

To achieve this, the exemplary methods use a long short-term memory (LSTM) to learn the segment's representation $$g_{v_{m'}:v_m} = f_\phi(s_{v_{m'}:v_m})$$

and the embeddings of prototypical option $o_k$, where $$s_{v_{m'}:v_m}$$

$v_m$=t indicates the current segment generated by $\pi_h$. To force the segment $$g_{v_{m'}:v_m}$$

and the option prototypes to be in the same space, the exemplary methods minimize the distance between $$s_{v_m': v_m},$$

and its closest prototype $o_k$.

The optimization problem the exemplary methods aim to solve is:

$$\mathcal{L}_{emb} = \Sigma_{m=1}^M \min_{k=1}^K \|f_\phi(s_{\{v_m: v_m\}}) - o_k\|_2^2,$$

The minimization of $\mathcal{L}_{emb}$ encourages each training segment to have some latent patch that is close to at least one prototypical option. These terms shape the latent space into a semantically meaningful clustering structure.

Regarding option prototype embedding learning ($g_o$), since the option prototype embeddings $o_{k=1}^K$ are representations in the latent space, they are not readily interpretable. For interpretability, the exemplary methods assign each prototypical option embedding $o_{k_{k=1}}^K$ with their closest segment embedding g in the training set.

As for learning option prototype embedding, the exemplary methods leverage both supervised learning and imitation learning regarding the effectiveness and interpretability. The exemplary methods attempt to minimize the least square loss between g and $o_k$, and prevent the learning of multiple similar prototypical options. The exemplary methods use a diversity regularization term that penalizes prototypical options that are close to each other. Meanwhile, the exemplary methods also consider the downstream task (e.g., imitation learning).

The full objective function of option learning is given as follows:

$$\mathcal{L}_{option} = -\lambda_1 * \mathcal{L}_{IL_{loss}} + \lambda_2 * \sum_{i=1}^K \min_{m=1}^M \left\| f_\phi\left(s_{v_{m'}: v_m}\right) - e_i \right\|_2^2 +$$

$$\lambda_3 * \sum_{i=1}^K \sum_{j=i+1}^K \max(0, d_{min} - \|e_i - e_j\|)$$

where the first term is for effectiveness, where an imitation learning objective function is conducted to learn the segment embeddings and option prototype embeddings to mimic expert's policy $\pi_E$. $\mathcal{L}_{IM_{loss}}$ (reproduced below) can be any imitation learning method, e.g., a behavior cloning loss or an adversarial imitation learning objective. The second term is for interpretability where an evidence regularization is used to encourage each prototypical option embedding to be as close to an encoded instance as possible. The third term is a diversity regularization term to learn diversified options, where $d_{min}$ is a threshold that classifies or determines whether two prototypes are close or not. $d_{min}$ is set to 1.0 in exemplary embodiments. $\lambda_1, \lambda_2, \lambda_3 \in [0, 1]$ are the weights used to balance the three loss terms.

Regarding option policy learning $\pi_0$, each option o maintains its own policy $\pi_o: s \to a_t$, which is parameterized by its own parameters $\theta_o$. To reduce the parameter complexity, the exemplary methods propose a contextual policy $\zeta_\theta(a_t|s_t, o_k)$ to learn a conditional policy which is conditioned on both the state and the option, which is shared among all the options.

The exemplary methods train the option policy $\pi_\theta(a_t|s_t, o_k)$ via the traditional imitation learning algorithms defined as $\mathcal{L}_{IL_{loss}}$, e.g., behavior cloning and adversarial imitation learning.

The goal of adversarial imitation learning is to minimize the JS divergence between trajectory distribution generated by the expert's policy and the option's policy.

Note that the exemplary methods use the same policy loss for both option prototypes and option policy, but the exemplary methods only optimize the parameters of option prototypes or option policy for each optimization step.

Regarding the full objective function, the loss minimized is:

$$\mathcal{L}_{Full} = w_1 \cdot \mathcal{L}_{option} + w_2 \cdot \mathcal{L}_{IL_{loss}} + w_3 \cdot \mathcal{L}_{emb}$$

where $w_1, w_2, w_3 \in [0, 1]$ are hyper-parameters to balance the weights of the three kinds of loss. As for optimization, the exemplary methods first initialize K groups segments followed by iteratively optimizing $\mathcal{L}_{option} + \mathcal{L}_{IL_{loss}} + \mathcal{L}_{emb}$.

Therefore, the exemplary embodiments introduce an interpretable imitation learning framework by discovering compositional structure which is called prototypical option discovery imitation learning (IPOD). IPOD constructs prototypical options which embed the skills of experts by an option embedding and an option policy via a prototype learning framework. IPOD generates interpretable agent policies by comparing the state segmentations to a few prototypical option embeddings followed by taking an action based on the option embedding. Unlike seeking a minimal subset of samples as prototypes that can serve as a distillation or condensed view of a data set, the exemplary model of the present invention uses a soft attention mechanism to derive prototypical option embedding from trajectory fragments. The exemplary methods also use the soft attention mechanism to create a bottleneck in the agent, forcing it to focus on option-relevant information.

Figure 2:
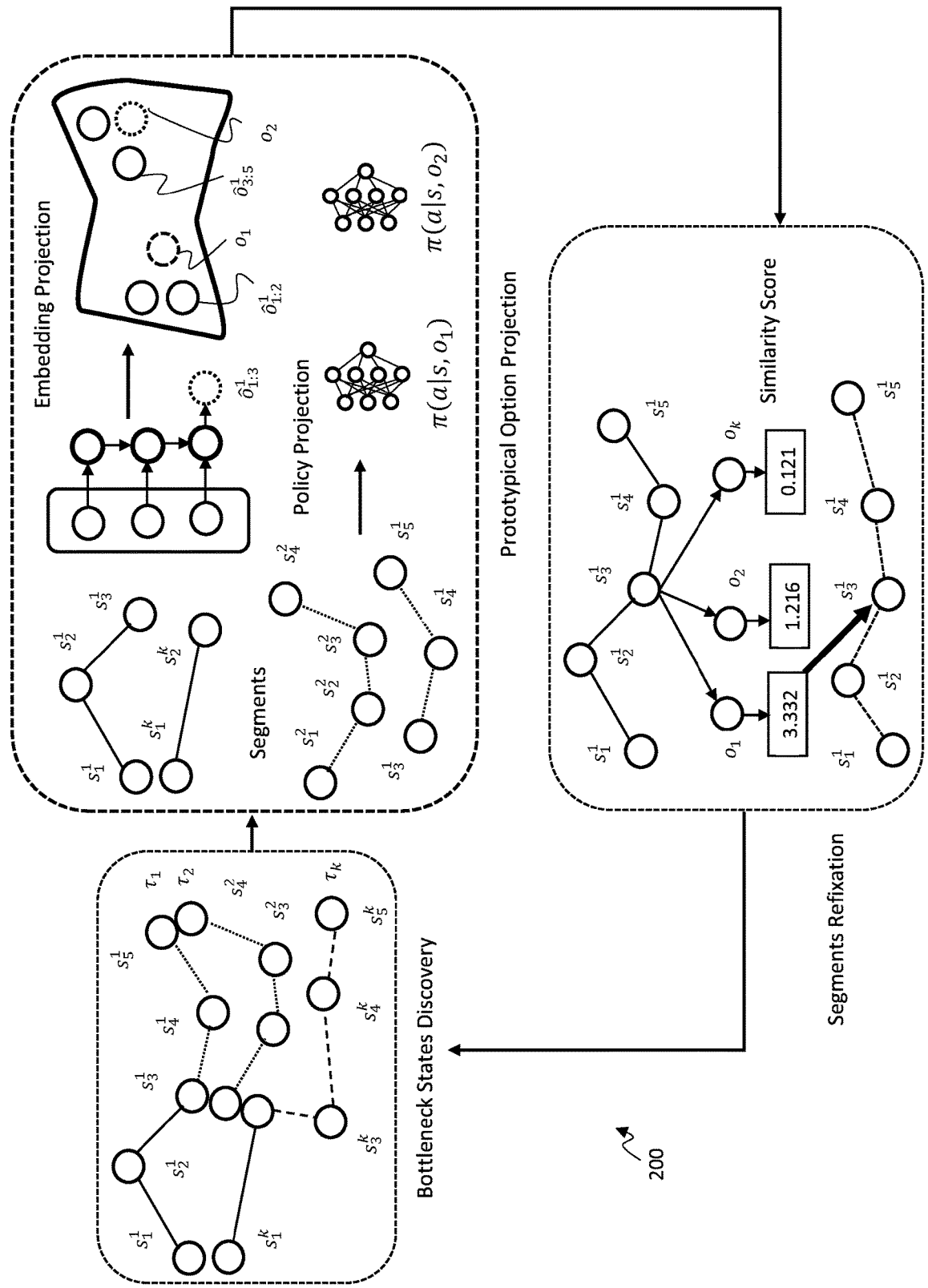
FIG. 2 is a block/flow diagram of an exemplary prototypical option discovery for interpretable imitation learning (IPOD) architecture, in accordance with embodiments of the present invention.
Figure 3:
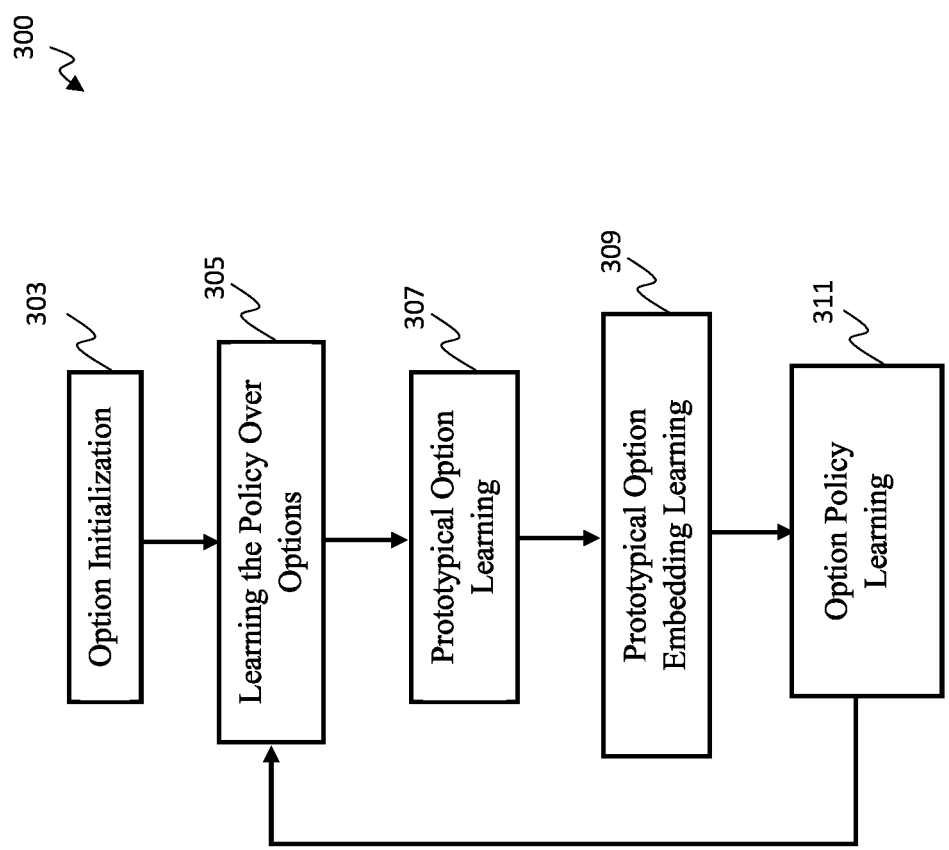
FIG. 3 is a block/flow diagram of an exemplary method for employing the IPOD architecture of FIG. 2, in accordance with embodiments of the present invention.

FIG. 3 is a block/flow diagram of an exemplary method 300 for employing the IPOD architecture of FIG. 2, in accordance with embodiments of the present invention.

Prototypical option discovery for interpretable imitation learning (IPOD) proposes to learn prototypical options for interpretable imitation. Each prototypical option is responsible for explaining a group of variable-length segments of the demonstration trajectory. The exemplary methods model each group of segments by computing distances to prototypical option embedding, where prototypical option embedding is a latent variable summarizing the segments. The IPOD model includes the following learning phases.

At block 303, option initialization takes place:

The IPOD first initializes the options by bottleneck state discovery methodology. Inspired by previous works on bottleneck state discovery, e.g., frequently visited states, the exemplary methods identify states that connect different densely connected regions in the state space. In order to discover such bottleneck states from expert demonstrations, the exemplary methods use the behavior cloning method with soft attention mechanism to obtain important states with large attention weights. The important states can then be found with DBSCAN clustering. The dense clusters derived from DBSCAN are used for option initialization.

At block 305, the policy over options learning takes place:

A prototypical option o includes four components $<I_o, \pi_o, \beta_o, g_o>$, an intra-option policy $\pi_o: \mathcal{S} \times \mathcal{A} \to [0, 1]$, a termination condition $\beta_o: \mathcal{S} \to [0,1]$, an initiation state set $I_0 \in \mathcal{S}$, and its option prototype $g_o$. To select an option in state $s_t$, $\pi_h(o|s)$ first constructs a set of admissible options given by:

$$\mathcal{O}_{(s_t)} = \{o_i | I_{o_i}(s_t) = 1 \cap \beta_{o_i}(s_t) = 0, \forall o_i \in \mathcal{O}\}$$

Here the $\mathcal{O}(s_t)$ is updated according to the $\pi_h(o|s)$. IPOD determines the $I_{o_i}(s_t)$ and $\beta_{o_i}(s\_t)$ by the output of $\pi_h$, i.e., $o_t$, where if $o_j=1$, $I_{o_i}(s_t)=1$ and $\beta_{o_i}(s_t)=0$. An example of how the agent $\pi_h(o|s)$ selects an option is shown above with respect to $\mathcal{O}(s_t)$.

$\pi_h(o|s)$ is learned to choose the admissible prototypical option. Since the exemplary methods utilize imitation learning to learn the intra-option policy, the reward of $\pi_h(o|s)$ is obtained by the selected option $\pi_o$ which takes primitive actions and receives the reward signal. Thus, the reward of the option is the cumulative reward of the actions taken from a current time to the termination of the option: $r_{\{t:t+\delta\}}= r_t + \ldots r_{\{t+\delta\}}$, where $\delta \in [0, T]$ is the time interval of the option on-going, and $t+\delta$ is the termination of the option $o_t$.

Given the transition $(s_t, o_t, r_{t:t+\delta})$, the exemplary methods update $\pi_h(o|s)$ taking option $o_t$ at state $s_t$ according to policy gradient:

$$\nabla J = \mathbb{E}_{s \sim \pi_h}[Q(s, \pi_h(o_t|s_t))]$$

where the option-value $Q(s_t, o_t)$ refers to the expected rewards for an action $o_t$ taken in a given state $s_t$.

At block 307, prototypical option learning takes place:

In the second stage, the exemplary methods aim to learn the option prototype, which is a sub-trajectory or segment generated by the experts. Each option prototype is responsible for explaining a group of variable-length segments of the demonstration trajectory $g_m$, generated by $\pi_h$. Thus, the exemplary methods first initialize K option prototype embedding $o_k \in \mathbb{R}^n$, $k=\{1, 2, 3, \ldots, K\}$ vectors as learnable parameters. Next, the exemplary methods map each group of segment $g_{m,k}$ individually into a low-dimension embedding $g_{m,k}$ by classifying the segment into the corresponding option's category k. Meanwhile, the exemplary methods learn $o_k$ by minimizing the distance between $o_k$ and $g_{m,k}$. Finally, the exemplary methods consider the segment which has the smallest distance with $o_k$ as the option prototype of $o_k$.

Regarding segmentation embedding learning, the exemplary methods aim to learn a meaningful latent space to represent the segments, where they are clustered (in L2-distance) around semantically similar prototypical options, and the clusters from different classes are well-separated.

To achieve this goal, the exemplary methods use an LSTM to learn the segment's representation $g_{v_m:v_m}=f_\phi (s_{v_m:v\_m})$ and the embeddings of prototypical option $o_k$, where $s_{v_m:v\_m}$, $v_m$=t indicates the current segment generated by $\pi_h$. To force the segment $s_{v_m:v\_m}$ and the option prototypes to be in the same space, the exemplary methods minimize the distance between $g_{v_m v_m}$ and its closest prototype $o_k$. The optimization problem to be solved is:

$$\mathcal{L}_{emb} = \sum_{m=1}^{M} \min_{k=1}^{K} \left\| f_\phi\left(s_{\{v_{m'}:v_m\}}\right) - o_k \right\|_2^2,$$

The minimization of $\mathcal{L}_{emb}$ encourages each training segment to have some latent patch that is close to at least one prototypical option. These terms shape the latent space into a semantically meaningful clustering structure.

At block 309, prototypical option embedding learning takes place:

Since the option prototype embeddings $o_{k=1}^K$ are representations in the latent space, they are not readily interpretable. For interpretable, the exemplary methods propose to assign each prototypical option embedding $o_{k=1}^K$ with their closest segment embedding g in the training set.

As for learning option prototype embedding, the exemplary methods leverage both supervised learning and imitation learning regarding effectiveness and interpretability. The exemplary methods try to minimize the least square loss between g and $o_k$ to prevent learning multiple similar prototypical options. The exemplary methods use a diversity regularization term that penalizes prototypical options that are close to each other. Meanwhile, the exemplary methods also consider the downstream task (imitation learning).

The full objective function is:

$$\mathcal{L}_{option} = -\lambda_1 * \mathcal{L}_{IL_{loss}} + \lambda_2 * \sum_{i=1}^{K} \min_{m=1}^{M} \left\| f_\phi\left(s_{v_{m'}:v_m}\right) - e_i \right\|_2^2 +$$

$$\lambda_3 * \sum_{i=1}^{K} \sum_{j=i+1}^{K} \max(0, d_{min} - \|e_i - e_j\|)$$

where the first term is for effectiveness and where an imitation learning objective function is conducted to learn the segment embeddings and option prototype embeddings to mimic expert's policy $\pi_E$. The second term is for interpretability where an evidence regularization is used to encourage each prototypical option embedding to be as close to an encoded instance as possible. The third term is a diversity regularization to learn diversified options and $d_{min}$ is a threshold that classifies whether two prototypes are close or not. The exemplary methods set $d_{min}$ to 1.0. $\lambda_1$, $\lambda_2$, $\lambda_3 \in [0,1]$ are the weights used to balance the three loss terms.

At block 311, option policy learning takes place:

Each option o maintains its own policy $\pi_o:s \rightarrow a_t$, which is parameterized by its own parameters $\theta_o$. To reduce the parameter complexity, the exemplary methods propose a contextual policy $\pi_\theta(a_t|s_t, o_k)$ to learn a conditional policy which is conditioned on both the state and the option, which shares among all the options.

The exemplary methods train the option policy $\pi_o(a_t|s_t, o_k)$ by traditional imitation learning algorithms, e.g., behavior cloning and adversarial imitation learning. The goal of behavior cloning is to mimic the action of the expert at each time step via supervised learning technical. The goal of adversarial imitation learning is to minimize the JS divergence between trajectory distribution generated by the expert's policy and the option's policy.

Note that the same policy loss is used for both option prototypes and option policy, but the exemplary methods only optimize the parameters of option prototypes or option policy for each optimization step. The exemplary methods can further train the option policy with imitation learning algorithms, e.g., behavior cloning and adversarial imitation learning. The goal of option policy learning is to mimic the segmentations of demonstrations from the experts.

Figure 4:
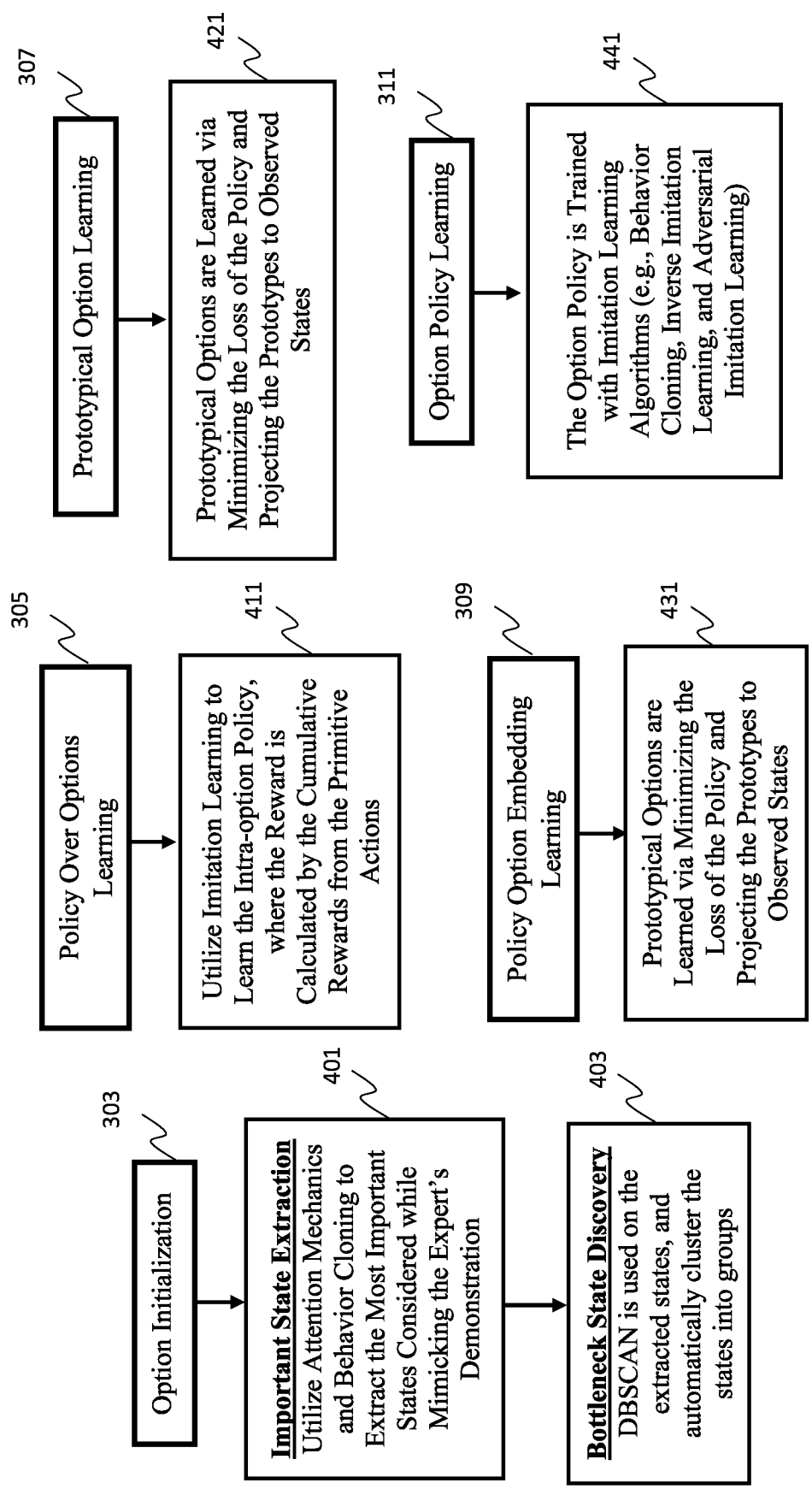
FIG. 4 is a block/flow diagram of an exemplary method for employing the option initialization, segmentation embedding learning, prototypical option learning, and option policy learning components of FIG. 3, in accordance with embodiments of the present invention.

FIG. 4 is a block/flow diagram of an exemplary method for employing the option initialization, segmentation embedding learning, prototypical option learning, and option policy learning components of FIG. 3, in accordance with embodiments of the present invention.

Imitation learning with neural networks efficiently learns a desired behavior in complex environments. However, these methods are usually considered as "black-boxes" which lack transparency, limiting their application in many decision-making scenarios. A variety of methods learn a hidden variable of the variation underlying expert demonstrations to construct the structure of expert policy and visualize the changes in the hidden variable. However, post-hoc explanations do not explain the reasoning process of how the model makes its decisions and can be incomplete or inaccurate in capturing the reasoning process of the original model. Therefore, it is often desirable to have models with built-in interpretability. The exemplary embodiments of the present invention define a form of interpretability in imitation learning that imitates human abstraction and explains its reasoning in a human-understanding manner. The exemplary methods enable prototype learning to discovery options for built-in interpretable imitation learning, which makes decisions by comparing the new inputs with a few data instances (prototypes).

Regarding the option initialization phase 303:

At block 401, attention mechanics and behavior cloning are utilized to extract the most important states considered while mimicking the expert's demonstration.

At block 403, for bottleneck state discovery, DBSCAN is used on the extracted states and the states are automatically clustered into groups.

Regarding policy over options learning 305:

At block 411, imitation learning is utilized to learn the intra-option policy, where the reward is calculated by the cumulative rewards from the primitive actions.

Regarding prototypical option learning 307:

At block 421, prototypical options are learned via minimizing the loss of the policy and projecting the prototypes to observed states.

Regarding prototypical option embedding learning 309:

At block 431, prototypical options are learned via minimizing the loss of the policy and projecting the prototypes to observed states.

Regarding option policy learning 311:

At block 441, the option policy is trained with imitation learning algorithms, such as behavior cloning, inverse imitation learning and adversarial imitation learning.

In summary, the exemplary methods introduce a new architecture, that is, prototypical option discovery for interpretable imitation learning (IPOD). Each prototypical option includes a set of segmentation from experts' trajectories and is embedded by an option policy. The IPOD uses a soft attention mechanism to derive prototypical option embedding from its trajectory fragments. Given a demonstration of the expert, the model matches the segmentations from the demonstration to the learned prototypical options, and makes an action based on the learned prototypical option. The exemplary methods also use the soft attention mechanism to create a bottleneck in the agent, forcing the agent to focus on option-relevant information. In this way, the model is interpretable, in the sense that it has a transparent reasoning process when making decisions. For better interpretability, the exemplary methods define several criteria for constructing the prototypes, including option diversity and accuracy.

The IPOD considers the prototype learning to discovery options for built-in interpretable imitation learning in accordance with the following as illustrated in FIG. 2. Bottleneck state discovery segments the input trajectories into disjoint segments of variable length by, e.g., density-based clustering methods. Option projection includes representation learning of the segmentations in each cluster, and prototypical option embedding learning. Option refixation takes the low-level actions controlled through the prototypical option embedding and refines each group of segments by matching the segmentation embeddings to prototypical option embeddings.

Figure 5:
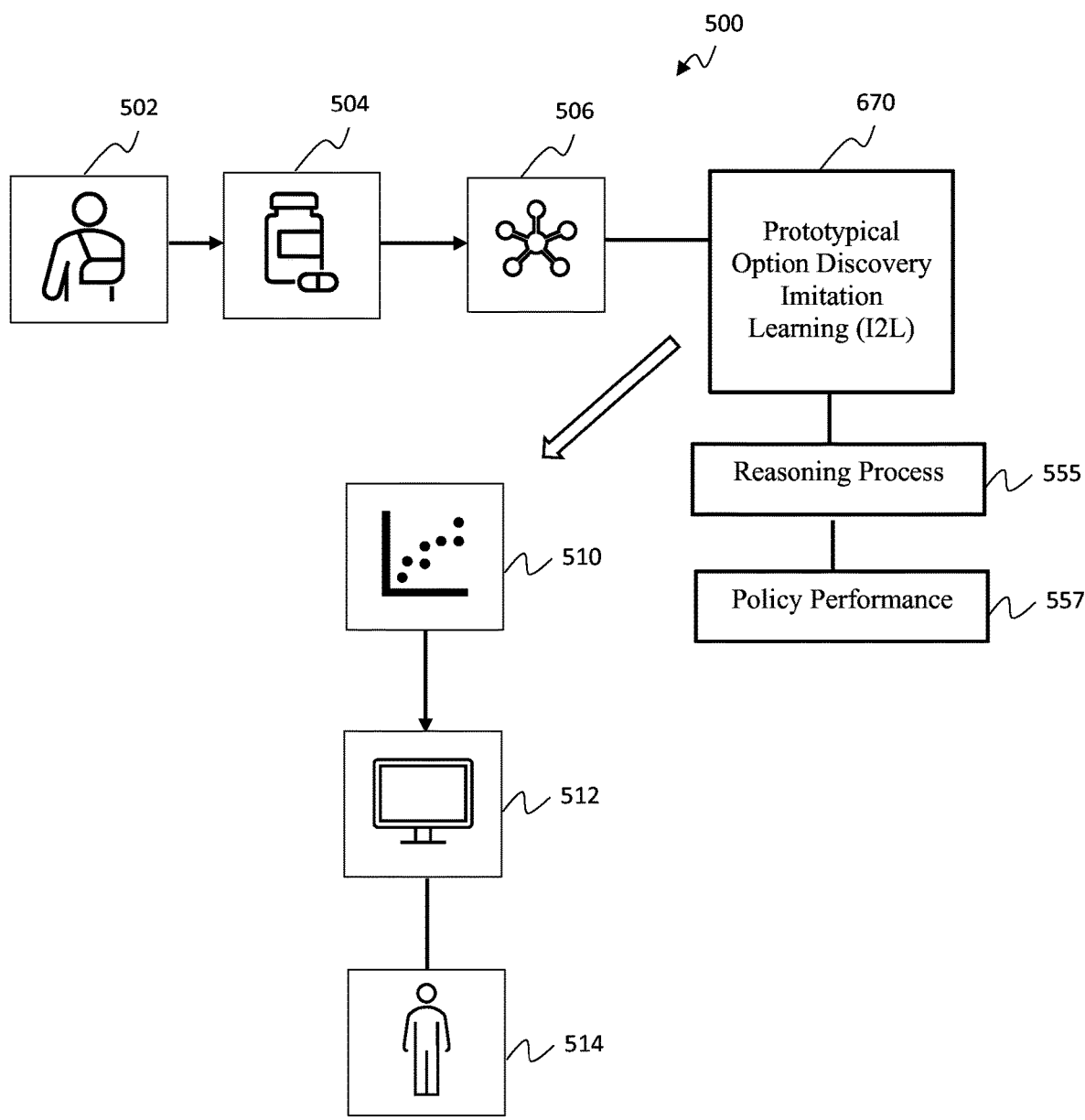
FIG. 5 is a block/flow diagram of a practical application of the IPOD architecture, in accordance with embodiments of the present invention.

FIG. 5 is a block/flow diagram 500 of a practical application of the IPOD architecture, in accordance with embodiments of the present invention.

In one practical example, a patient 502 needs to receive medication 504. Options are computed for indicating different levels of dosages of the medication 504. The exemplary methods learn a prototypical contextual policy $\pi(a|s, o)$ to take action based on states 506. The IPOD architecture 670 is implemented to enable prototypical option visualization by executing a reasoning process 555 and evaluating policy performance 557. I2L 670, via the reasoning process 555, can smoothly compose the different options by considering the variant states 506 of the patient 502. In one instance, I2L 670 can chose the low-dosage option for the patient 502. The results 510 (e.g., dosage options) can be provided or displayed on a user interface 512 handled by a user 514.

Figure 6:
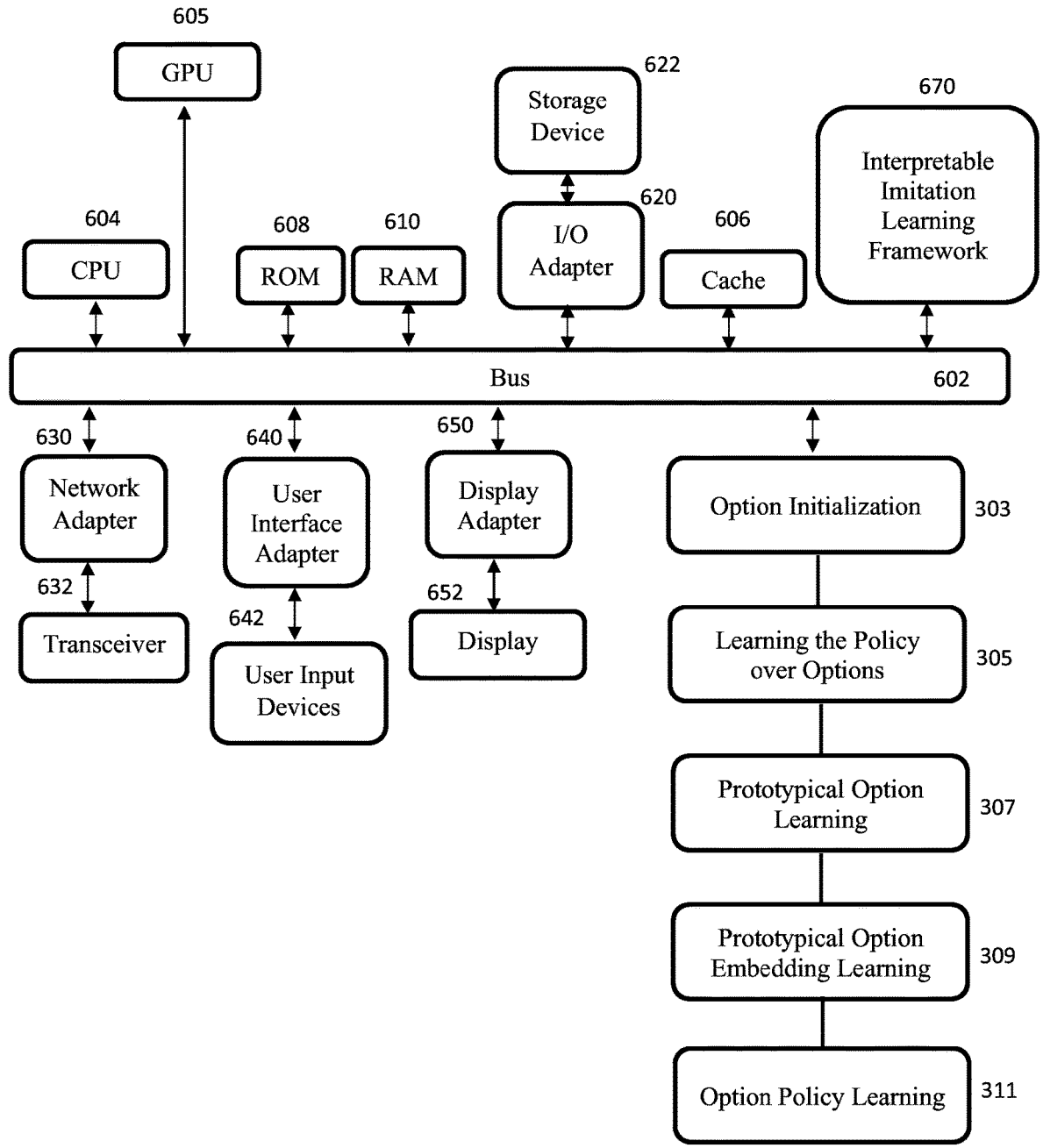
FIG. 6 is an exemplary processing system for the IPOD architecture, in accordance with embodiments of the present invention.

FIG. 6 is an exemplary processing system for GBL, in accordance with embodiments of the present invention.

The processing system includes at least one processor (CPU) 604 operatively coupled to other components via a system bus 602. A GPU 605, a cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, an interpretable imitation learning framework 670 can be employed to execute option initialization 303, policy over options learning 305, prototypical option learning 307, prototypical option embedding learning 309, and option policy learning 311.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
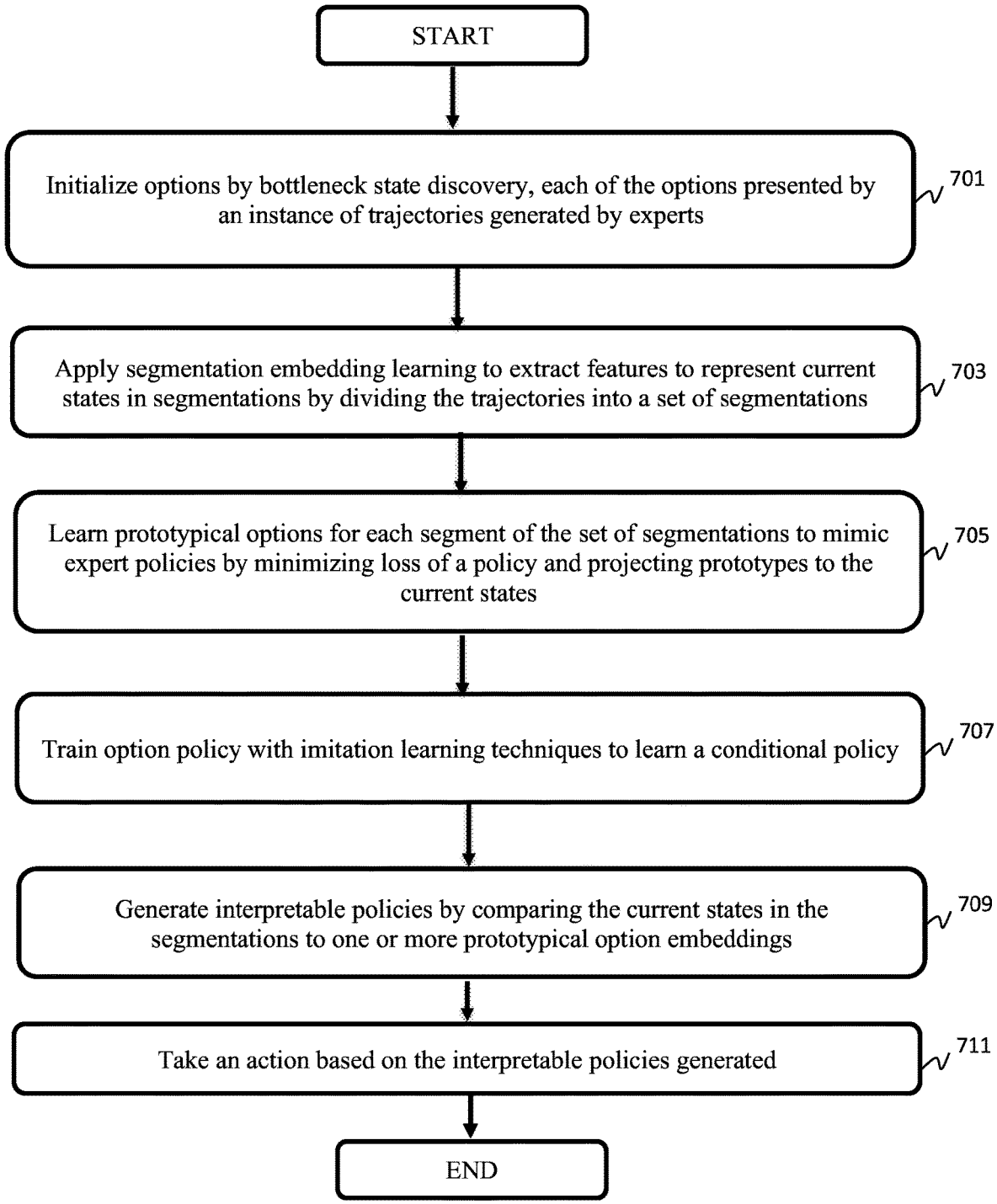
FIG. 7 is a block/flow diagram of an exemplary method for executing the IPOD architecture, in accordance with embodiments of the present invention.

FIG. 7 is a block/flow diagram of an exemplary method for executing the IPOD architecture, in accordance with embodiments of the present invention.

At block 701, initialize options by bottleneck state discovery, each of the options presented by an instance of trajectories generated by experts.

At block 703, apply segmentation embedding learning to extract features to represent current states in segmentations by dividing the trajectories into a set of segmentations.

At block 705, learn prototypical options for each segment of the set of segmentations to mimic expert policies by minimizing loss of a policy and projecting prototypes to the current states.

At block 707, train option policy with imitation learning techniques to learn a conditional policy.

At block 709, generate interpretable policies by comparing the current states in the segmentations to one or more prototypical option embeddings.

At block 711, take an action based on the interpretable policies generated.

FIG. 8 illustrates exemplary equations 800 for implementing the IPOD architecture, in accordance with embodiments of the present invention.

The equations include a loss function for segmentation embedding learning, an objective function, and policy losses.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for learning prototypical options for interpretable imitation learning, the method comprising:
   initializing options by bottleneck state discovery, each of the options presented by an instance of trajectories generated by experts;
   applying segmentation embedding learning to extract features to represent current states in segmentations by dividing the trajectories into a set of segmentations;
   learning prototypical options for each segment of the set of segmentations to mimic expert policies by minimizing loss of a policy and projecting prototypes to the current states;
   learning prototypical option embedding using an objective function:

$$\mathcal{L}_{option} = -\lambda_1 * \mathcal{L}_{IL_{loss}} + \lambda_2 * \sum_{i=1}^{K} \min_{m=1}^{M} = \left\| f_\phi(s_{v'_m} : v_m) - e_i \right\|_2^2 +$$

$$\lambda_3 * \sum_{i=1}^{K} \sum_{j=i+1}^{K} \max(0, d_{min} - \|e_i - e_j\|)$$

where $L_{IL_{loss}}$ is an imitation learning loss, $f_\phi$ is, the second term is a segment representation function for a segment $s_{v'_m,v_m}$ from segment $v_m$ to segment $v_{m'}$, $e_i$ and $e_j$ are embedded prototypes, K is a number of prototypes, M is a number of segments, $d_{min}$ is a threshold value, and $\lambda_1$, $\lambda_2$, and $\lambda_3$, are weighting parameters;
   training option policy with imitation learning techniques to learn a conditional policy;
   generating interpretable policies by comparing the current states in the segmentations to one or more prototypical option embeddings;
   generating dosage options for a patient based on the interpretable policies;
   displaying the dosage options on a user interface for a user; and
   taking an action based on the dosage options.

2. The method of claim 1, wherein option initialization includes identifying states from the current states that connect different densely connected regions in a state space.

3. The method of claim 2, wherein a soft attention mechanism is employed to obtain important states with particular attention weights.

4. The method of claim 3, wherein the important states are found with density-based spatial clustering of applications with noise (DBSCAN).

5. The method of claim 1, wherein the bottleneck state discovery divides the trajectories generated by the experts into disjoint segments of variable length by a density-based clustering method.

6. The method of claim 1, wherein each of the options includes an intra-option policy, a termination condition, an initiation state set, and an option prototype.

7. The method of claim 6, wherein the option prototype is defined by a sub-trajectory generated by the experts.

8. The method of claim 1, wherein each of the one or more prototypical option embeddings is assigned with a respective closest segment embedding in a training set.

9. The method of claim 1, wherein the loss is a least square loss.

10. The method of claim 1, wherein a diversity regularization term is employed to penalize one or more of the prototypical options that are close to each other.

11. A non-transitory computer-readable storage medium comprising a computer-readable program for learning prototypical options for interpretable imitation learning, wherein the computer-readable program when executed on a computer causes the computer to perform the steps of:
   initializing options by bottleneck state discovery, each of the options presented by an instance of trajectories generated by experts;
   applying segmentation embedding learning to extract features to represent current states in segmentations by dividing the trajectories into a set of segmentations;
   learning prototypical options for each segment of the set of segmentations to mimic expert policies by minimizing loss of a policy and projecting prototypes to the current states; learning prototypical option embedding using an objective function:

$$\mathcal{L}_{option} = -\lambda_1 * \mathcal{L}_{IL_{loss}} + \lambda_2 * \sum_{i=1}^{K} \min_{m=1}^{M} = \left\| f_\phi(s_{v'_m} : v_m) - e_i \right\|_2^2 +$$

$$\lambda_3 * \sum_{i=1}^{K} \sum_{j=i+1}^{K} \max(0, d_{min} - \|e_i - e_j\|)$$

where $L_{IL_{loss}}$ is an imitation learning loss, $f_\varphi$ is, the second term is a segment representation function for a segment $s_{v'_m v_m}$ from segment $v_m$ to segment $v_{m'}$, $e_i$ and $e_j$ are embedded prototypes, K is a number of prototypes, M is a number of segments, $d_{min}$ is a threshold value, and $\lambda_1$, $\lambda_2$, and $\lambda_3$ are weighting parameters:

training option policy with imitation learning techniques to learn a conditional policy;

generating interpretable policies by comparing the current states in the segmentations to one or more prototypical option embeddings;

generating dosage options for a patient based on the interpretable policies;

displaying the dosage options on a user interface for a user; and taking an action based on the interpretable policies generated dosage options.

12. The non-transitory computer-readable storage medium of claim 11, wherein option initialization includes identifying states from the current states that connect different densely connected regions in a state space.

13. The non-transitory computer-readable storage medium of claim 12, wherein a soft attention mechanism is employed to obtain important states with particular attention weights.

14. The non-transitory computer-readable storage medium of claim 13, wherein the important states are found with density-based spatial clustering of applications with noise (DBSCAN).

15. The non-transitory computer-readable storage medium of claim 11, wherein the bottleneck state discovery divides the trajectories generated by the experts into disjoint segments of variable length by a density-based clustering method.

16. The non-transitory computer-readable storage medium of claim 11, wherein each of the options includes an intra-option policy, a termination condition, an initiation state set, and an option prototype.

17. The non-transitory computer-readable storage medium of claim 16, wherein the option prototype is defined by a sub-trajectory generated by the experts.

18. The non-transitory computer-readable storage medium of claim 11, wherein each of the one or more prototypical option embeddings is assigned with a respective closest segment embedding in a training set.

* * * * *